US008073195B2

(12) United States Patent  
Quine et al.

(10) Patent No.: US 8,073,195 B2
(45) Date of Patent: Dec. 6, 2011

(54) METHOD AND APPARATUS FOR DETECTING MALFUNCTIONING PRINT ELEMENTS IN POSTAGE METER INDICIA PRINTER

(75) Inventors: Douglas B. Quine, Bethel, CT (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 970 days.

(21) Appl. No.: 11/955,446

(22) Filed: Dec. 13, 2007

(65) Prior Publication Data

US 2009/0154766 A1 Jun. 18, 2009

(51) Int. Cl.
*G06K 9/00* (2006.01)
(52) U.S. Cl. ........... 382/101; 382/112; 209/584; 347/19
(58) Field of Classification Search .................. 382/101, 382/112; 705/401; 209/583, 584; 347/19
See application file for complete search history.

(56) References Cited

U.S. PATENT DOCUMENTS

| | | | | |
|---|---|---|---|---|
| 5,822,455 | A * | 10/1998 | Sano et al. | 382/202 |
| 5,862,243 | A * | 1/1999 | Baker et al. | 382/101 |
| 6,412,902 | B2 * | 7/2002 | Matsumoto et al. | 347/19 |
| 6,435,642 | B1 | 8/2002 | Jackson et al. | |
| 2005/0046658 | A1 * | 3/2005 | Kojima | 347/19 |
| 2005/0097066 | A1 * | 5/2005 | Nambudiri | 705/401 |
| 2006/0061616 | A1 * | 3/2006 | Yamazaki | 347/19 |
| 2007/0132801 | A1 * | 6/2007 | Reichelsheimer et al. | 347/19 |
| 2007/0211101 | A1 * | 9/2007 | Yamanobe | 347/19 |

* cited by examiner

*Primary Examiner* — Jon Chang
(74) *Attorney, Agent, or Firm* — Steven J. Shapiro; Charles R. Malandra, Jr.

(57) ABSTRACT

In a mailing machine, an image element included in a postage meter indicium printed on a mail piece is transported past a linear image capture device. The image capture device is operated to produce a smeared image of the image element. The smeared image is then automatically analyzed to detect failures in the print elements of a postage meter that is part of the mailing machine.

18 Claims, 5 Drawing Sheets

METHOD AND APPARATUS FOR DETECTING MALFUNCTIONING PRINT ELEMENTS IN POSTAGE METER INDICIA PRINTER

BACKGROUND

This invention relates generally to the field of mailing machines, and more particularly to a mailing machine that has capabilities for detecting malfunctions in its printing component.

Generally, a mail piece transport on a mailing machine transports envelopes and other mail pieces along a transport path so that various functions may be performed on the mail piece at different locations along the transport path. For example, at one location along the transport path the mail piece may be weighed, at another location the mail piece may be sealed, and at a further location an indicium for postage may be applied to the mail piece. Drive rollers and/or drive belts may be employed to contact the mail piece to propel the mail piece along the transport path. The postage indicium may be applied by printing with a printing device on the mail piece. The printing device is subject to control by a postage security device (PSD) which holds postage funds and dispenses funds by allowing the printing device to print the postage indicia. The PSD performs accounting functions to account for the dispensing of funds via the printing of postage indicia. The accounting functions include deducting funds from the amount of postage stored in the PSD in regard to each postage indicium printed by the printing device.

In accordance with some proposals, the postage indicium may contain a barcode or other machine-readable data to aid in verification of the validity of the postage indicium. One such postage indicium is defined in the Information-Based Indicia Program (IBIP) promulgated by the U.S. Postal Service.

Mailing machines are often run at high speed, and may handle batches consisting of thousands of mail pieces within a relatively short time. To the extent that operation of the mailing machine is attended by a human operator, often the operator's attention is concerned with feeding mail pieces into the mailing machine or with other tasks, and the operator may not have an opportunity to closely monitor the condition of mail pieces upon completion of processing of the mail pieces by the mailing machine. In particular, even if operation of the mailing machine is attended by a human operator, the operator may not be able to quickly and readily detect malfunctions of the postage meter printing device that may result in improper printing of postage indicia on mail pieces that are being processed by the mailing machine. Detection of improper printing may be of particular importance if the printing device is an ink jet printer, as has been proposed.

Failure of the printing device to properly print postage indicia may occur for a number of reasons. For example, improper printing or non-printing of indicia may occur due to one or more clogged ink nozzles or jets, or due to one or more ink jets being burned out, or because of a failure in the supply of ink to the print head. The printing device may also be subject to electronic failures.

Even a minor failure of the printing device may interfere with printing of the indicium barcode to an extent such that the indicium would fail a verification procedure that may be performed by postal authorities.

In at least some cases, occurrence of a failure in the printing device may not be known to the PSD. Consequently, the PSD may continue to allow the printing device to print indicia on mail pieces, as mail pieces are transported in sequence through the mailing machine, and may continue to deduct funds from the postage stored in the PSD, even at times when the printing device is failing to print proper indicia on mail pieces transported past the printing device. This may have the effect of charging the proprietor of the mailing machine for postage even though the corresponding postage indicia were not effectively applied to the mail pieces. There may be no way for the proprietor of the mailing machine to recover the postage amounts which the PSD has dispensed, even though the postage was not properly printed on the mail pieces. Thus the failure or improper operation of the printing device may result in substantial financial loss to the proprietor of the mailing machine, particularly if large batches of mail are processed at high speed by a mailing machine in which the printing device has failed.

In view of the foregoing, it has been proposed (e.g., in U.S. published patent application no. 2005/0097066) to include a reading device in a mailing machine to read at least some of the postage indicia to confirm that the indicia are being printed with adequate print quality.

The present inventor has now proposed a method and mechanism for automatically detecting and diagnosing failure of individual print elements in a postage meter.

SUMMARY

Accordingly, the present invention provides an improved method for operating a mailing machine. The method includes transporting a mail piece along a transport path past a print head and an image capture device. The print head includes a linear array of print elements. The array is oriented transversely to the direction in which the mail piece is transported. The image capture device is downstream from the print head along the transport path. The image capture device includes a linear array of image capture elements. The array of image capture elements is oriented parallel to the array of print elements. The image capture device is positioned to capture an image of an indicium printed by the print head on the mail piece.

The method further includes selectively operating individual print elements to print a two-dimensional (2-D) barcode on the mail piece. This is done while the mail piece is being transported past the print head.

The method also includes placing the image capture elements in an image capture mode. This is done while the mail piece is being transported past the image capture device and before the 2-D barcode reaches the image capture device. The image capture elements are maintained in the image capture mode until the 2-D barcode has entirely passed the image capture device. The image capture mode is ended after the 2-D barcode has entirely passed the image capture device.

In addition, the method includes analyzing image signals generated by the image capture elements during the image capture mode to determine whether any of the print elements has failed.

The print head may be part of a postage meter. The transporting of the mail piece may be performed by a mail piece transport mechanism that is part of a mailing machine in which the postage meter is installed. The transporting of the mail piece may be at a rate of at least about 50 inches per second.

The image signals generated by the image capture elements may represent a smeared image of the 2-D barcode. The smeared image may be a linear image that is one pixel wide. The analyzing of the image signals may include detecting gaps in the smeared image.

The method may also include detecting a leading edge of the mail piece and triggering the placing of the image capture elements in the image capture mode at a predetermined time interval after a point in time when the leading edge of the mail piece was detected.

The print elements may be ink jet print elements.

According to another aspect of the invention, a mailing machine includes a transport mechanism for transporting a mail piece along a transport path. The mailing machine also includes a print head located adjacent the transport path for printing a postage meter indicium on the mail piece while the mail piece is transported past the print head. The print head includes a linear array of print elements. The array is oriented transversely to the direction in which the mail piece is transported.

The mailing machine further includes an image capture device located adjacent the transport path downstream from the print head. The image capture device includes a linear array of image capture elements. The array of image capture elements is oriented parallel to the array of print elements. The image capture device is positioned to capture an image of the postage meter indicium printed by the print head on the mail piece.

In addition, the mailing machine includes at least one control device coupled to the transport mechanism, to the print head and to the image capture device. The at least one control device is operative to control the print head so as to operate individual ink jet print elements to print a 2-D barcode on the mail piece as part of the postage indicium. The at least one control device is further operative to control the image capture device (a) such that the image capture elements are (i) placed in an image capture mode before the 2-D barcode reaches the image capture device, and (ii) maintained in the image capture mode until the 2-D barcode has entirely passed the image capture device, and (b) such that the image capture mode is ended after the 2-D barcode has entirely passed the image capture device.

The at least one control device is also operative to analyze the image signals generated by the image capture elements during the image capture mode to determine whether any of the print elements has failed.

The mailing machine may further include a sensor located adjacent the transport path between the print head and the image capture device. The sensor may perform the function of detecting the leading edge of the mail piece. The sensor may be coupled to the at least one control device. The at least one control device may be responsive to the sensor by triggering the placing of the image capture elements in the image capture mode at a predetermined time interval after a point in time when the sensor detected the leading edge of the mail piece.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The method described herein may allow for automatic detection of failures among the print elements of a postage meter that is part of a mailing machine. This may be done by using a linear array of image capture elements to capture a smeared image of a 2-D barcode printed by the postage meter. The image signal level generated by each image capture element may be compared to a threshold to detect regions of the barcode that failed to be printed properly. Such regions, if present, may indicate failures of corresponding print elements.

Figure 1:
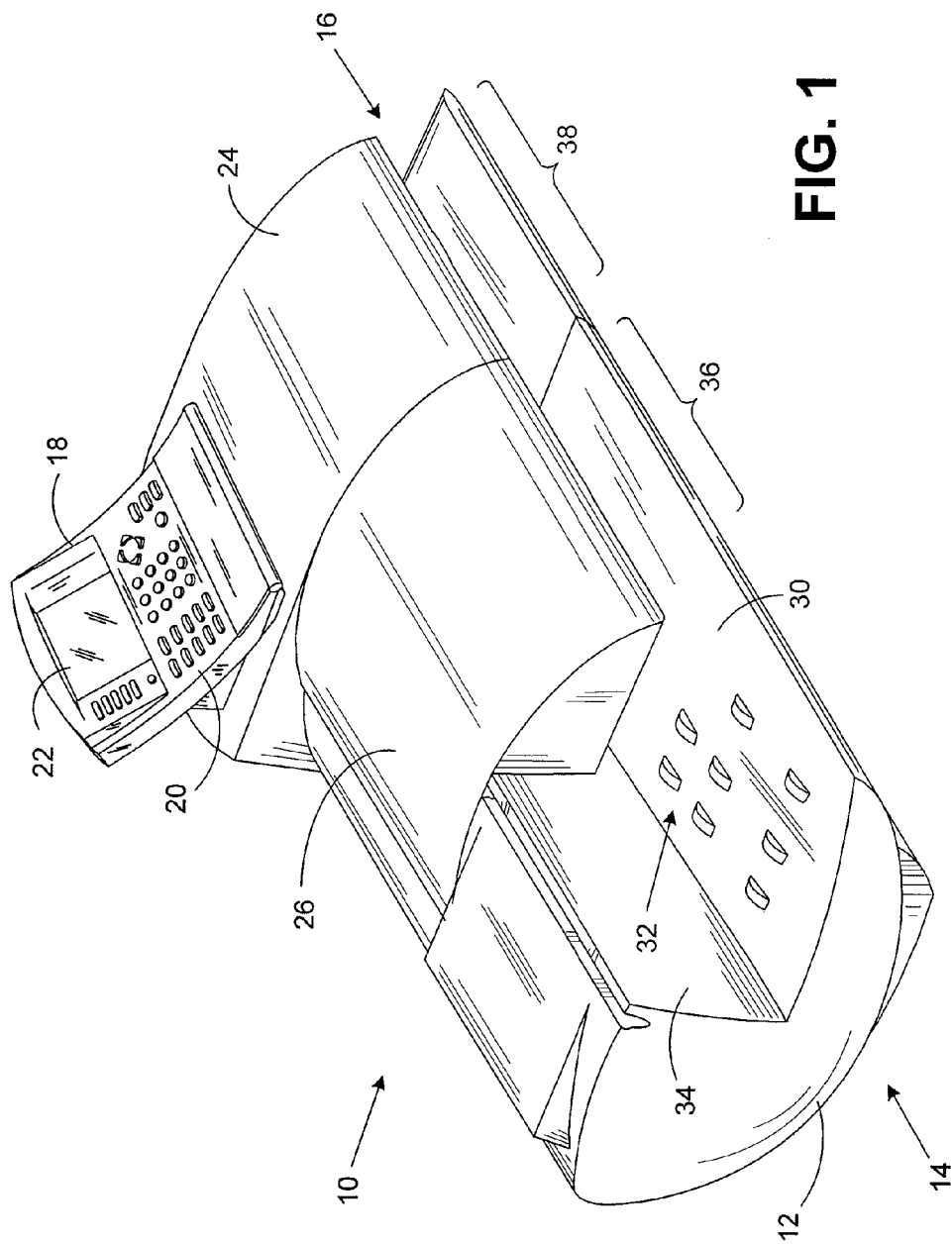
FIG. 1 is a perspective view of a typical mailing machine constructed and arranged in accordance with the principles of the present invention.

Referring now to the drawings, and particularly to FIG. 1, the reference numeral 10 indicates generally a typical mailing machine which incorporates the principles of the present invention. The mailing machine 10 includes a base unit generally designated by the reference numeral 12. The base unit 12 has an envelope infeed end, generally designated by the reference numeral 14, and an envelope outfeed end, designated generally by the reference numeral 16. A control unit 18 is mounted on the base unit 12, and includes one or more input/output devices, such as, for example, a keyboard 20 and a display device 22. A PSD (postage security device), which is not separately shown, may be contained within the control unit 18.

Cover members 24, 26 are pivotally mounted on the base 12 and are moveable between a closed position shown in FIG. 1 and an open position (not shown). In the open position of the cover members 24, 26, various operating components and parts are exposed for service and/or repair as needed. A mail piece transport mechanism which is not visible in FIG. 1 is housed under the cover members 24, 26.

The base unit 12 further includes a generally horizontal feed deck 30 which extends substantially from the infeed end 14 to the outfeed end 16. A plurality of nudger rollers 32 are suitably mounted under the feed deck 30 and project upwardly through openings in the feed deck so that the rollers 32 can exert a forward feeding force on a succession of mail pieces placed in the infeed end 14. A vertical wall 34 defines a mail piece stacking location from which the mail pieces are fed by the nudger rollers 32 along the feed deck 30 and into the transport mechanism referred to above. The transport mechanism transports the mail pieces through one or more modules, such as, for example, a separator module and moistening/sealing module. Each of these modules is located generally in the area indicated by reference numeral 36, and is not visible in the drawing. The mail pieces are then passed to a printing module located generally in the area indicated by reference numeral 38. A barcode image capture module, to be discussed below, may be located in the area 38 downstream from the printing module. The barcode image capture module and printing modules also are not visible in FIG. 1.

Figure 2:
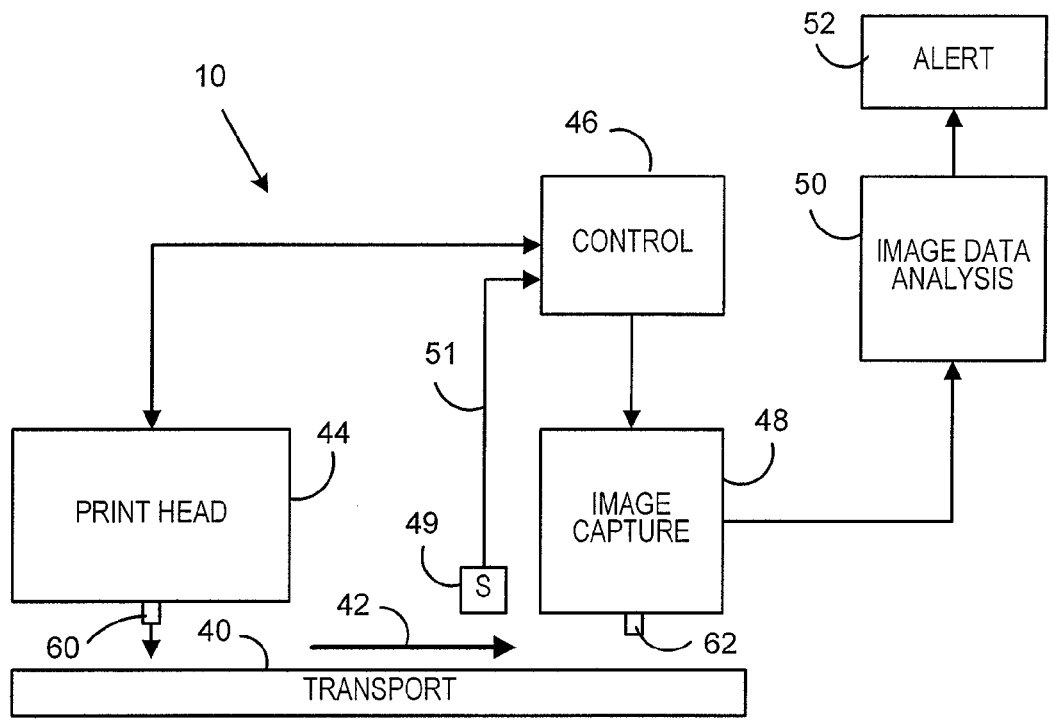
FIG. 2 is a block diagram of aspects of the mailing machine of FIG. 1.

FIG. 2 is a block diagram representation of aspects of the mailing machine 10. As depicted in FIG. 2, the mailing machine 10 includes a transport mechanism 40, which may be constructed in accordance with conventional principles. For example, the transport mechanism 40 may include one or more drive belts, drive rollers and/or pressure rollers, which are not separately shown. The transport mechanism 40 transports mail pieces (not shown) along a transport path, which is indicated by arrow 42. (It will be appreciated that the arrow 42 may not indicate the entire transport path. The transport path may commence upstream from, and may continue downstream from, the region specifically indicated by the arrow 42.)

The mailing machine 10 also includes a postage meter, which includes the above-mentioned PSD as well as a printing device (including print head 44, FIG. 2) mounted on the mailing machine 10 adjacent the transport path 42. The postage meter prints postage indicia on mail pieces transported along the transport path 42 by the transport mechanism 40. The PSD (not separately shown) is coupled to and is part of the control mechanism for the print head 44. In some embodiments, all hardware aspects of the postage meter may be provided in accordance with conventional practices, and the PSD may also control the printing head 44 and may store and account for postage funds in accordance with conventional practices. As discussed in more detail below, the print head 44 includes an array of print elements 60.

The mailing machine 10 also includes a control device 46. The control device 46 may be integrated with an over-all controller (not separately shown) for the mailing machine 10 and may be included in the control unit 18. Alternatively, the control device 46 may be partially or completely dedicated to a barcode image capture module 48, which is also included in the mailing machine 10. The barcode image capture module 48 may be mounted on the mailing machine 10 adjacent the transport path 42 and downstream from the print head 44. As discussed in more detail below, the image capture module 48 includes an array of image capture elements 62. The control device 46 may also provide some control functions for the print head 44, such as controlling the timing at which the print head 44 prints postage indicia on mail pieces.

Moreover, the mailing machine 10 may include a sensor 49. The sensor 49 may be located adjacent the transport path 49 between the print head 44 and the image capture module 48, and just upstream from the image capture module. The function of the sensor 49 may be to detect the leading edges of mail pieces transported by the transport mechanism 40. The sensor 49 may be in communication with the control device 46 via signal path 51 to provide a signal to the control device 46 to indicate that the sensor has detected the leading edge of a mail piece.

The mailing machine 10 may further include suitable circuitry 50 to receive and analyze image data generated by and read out from the barcode image capture module 48. The image data analysis circuitry 50 may be incorporated in a controller for the mailing machine as a whole or may be partially or completely dedicated to analyzing barcode image data. The image data analysis circuitry 50 may be constituted by a suitably programmed microprocessor or microcontroller; moreover, all of the control or data analysis elements referred to herein may be constituted by one or more suitably programmed microprocessors or microcontrollers. The image data analysis circuitry 50 may, for example, be integrated with the control device 46.

Still further, the mailing machine 10 may include one or more output devices 52 that are responsive to image data analysis circuitry 50 to indicate an alert condition to a human operator in the event that the image data analysis circuitry 50 determines a degree of malfunctioning in the print head 44.

Figure 3:
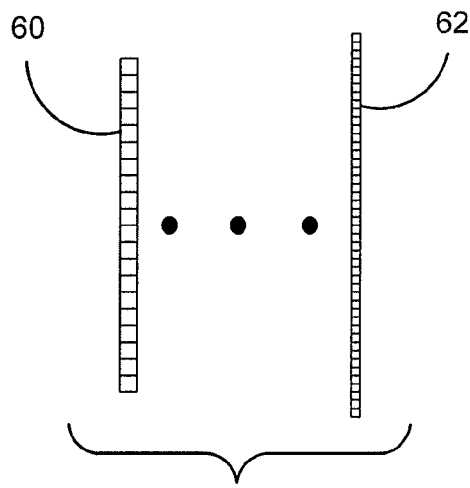
FIG. 3 schematically depicts a relationship between two components of the mailing machine of FIG. 1, as viewed from below.

FIG. 3 schematically depicts a relationship between respective components of the print head 44 and the image capture device 48. In particular, FIG. 3 schematically shows a linear array of ink jet print elements 60 that are part of print head 44 (not otherwise shown in FIG. 3), and a linear array of image capture elements 62 that are part of the image capture module 48 (not otherwise shown in FIG. 3). The ink jet print element array 60 and the image capture element array 62 are oriented parallel to each other and transversely (e.g., perpendicular) to the mail piece transport path 42 (FIG. 2). As is implied by previous discussion, the image capture element array 62 is located downstream from the ink jet print element array 60. The image capture element array 62 is positioned so as to capture images of postage meter indicia printed by the print head 44/ink jet print element array 60 on mail pieces transported by the transport mechanism 40.

In some embodiments, the ink jet print elements 60 have a density of 300 per inch (300 dpi). Preferably the image capture elements 62 have at least twice the density of the ink jet print elements 60, say 600 per inch for the image capture elements. The ink jet print element array 60 may have a length of about ¾ inch, and the image capture element array 62 may be somewhat longer, with the longitudinal placement (i.e., in the direction of orientation of the arrays) of the image capture element array such that it begins before and ends after the ink jet print element array. In other words, the image capture element array 62 may be longer than the height of postage meter indicia printed by the ink jet print element array 60. (The actual number of elements in each array may be larger than the number of elements schematically represented in FIG. 3.)

According to the description of the print element array 60 and the image capture element array 62 in the preceding paragraph, there are two image capture elements for each print element, to allow for Nyquist sampling. In other embodiments, however, there may be three, four, five or more image capture elements for each print element. The data output from the multiple image elements mapped to each print element may be considered together to determine whether the print element has failed. Alternatively, the resolution of the image capture element array may be equal to or less than the resolution of the print element array. For example, the resolution of the image capture element array may be related to the size of the barcode data cells, e.g., with about one image data capture element for every three print elements so as to perform Nyquist sampling to detect failed barcode elements.

The ink jet print element array 60 may be constructed in a conventional manner. Moreover, the image capture element array 62 may be constituted by off-the-shelf components. For example, the image capture element array may be constituted by a low cost linear imager (scanner). It will be noted that the array 62 typically is a 1×N array, with N an integer greater than one. In some embodiments, the array 62 is not part of a rectangular array of image capture elements, where a rectangular array is considered to be an M×N array, with M and N both integers greater than 1. In other embodiments, for increased light sensitivity or sampling redundancy, the array 62 may be part of an M×N array, with M and N both integers greater than 1.

Figure 4:
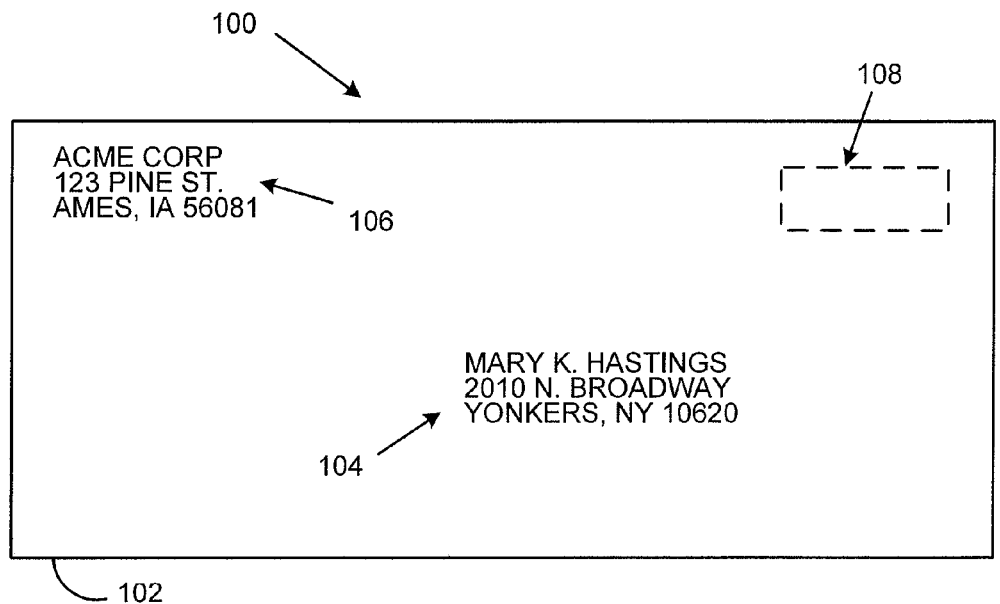
FIG. 4 is a somewhat schematic plan view of a typical mail piece processed by the mailing machine.

FIG. 4 is a somewhat schematic plan view of a typical mail piece 100 processed by the mailing machine 10. The mail piece 100 may take the form of a standard no. 10 envelope, having a destination address 104 and a return address 106 printed thereon. More significantly, for present purposes, the mail piece 100 also has a postage indicium that has been printed thereon by the postage meter 44 of the mailing machine 44. To simplify the drawing, the postage indicium is represented by a dashed line rectangle 108 in FIG. 4, but a more detailed illustration of the postage indicium 108 appears in specimen form in FIG. 5.

Figure 5:
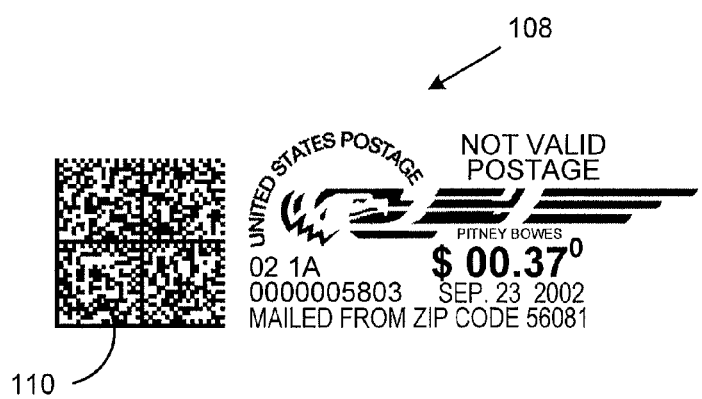
FIG. 5 is a specimen representation of a postage indicium printed on the mail piece of FIG. 4 by the mailing machine.

Referring to FIG. 5, the indicium 108 may include, among other conventional elements, a two-dimensional barcode 110 by which machine-readable data is presented. The indicium 108, and particularly the two-dimensional barcode 110, may generally be in compliance with the "Information-Based Indicia Program" (IBIP) promulgated by the U.S. Postal Service. The barcode 110 may be provided in accordance with the well known Data Matrix code format or may be based on the well known PDF417 standard. The two-dimensional barcode 110 may contain high-density variable cryptographically protected information, which may be used for security and marketing purposes.

There will now be described, with reference to FIG. 6, a process performed in the mailing machine 10, according to some embodiments.

Figure 6:
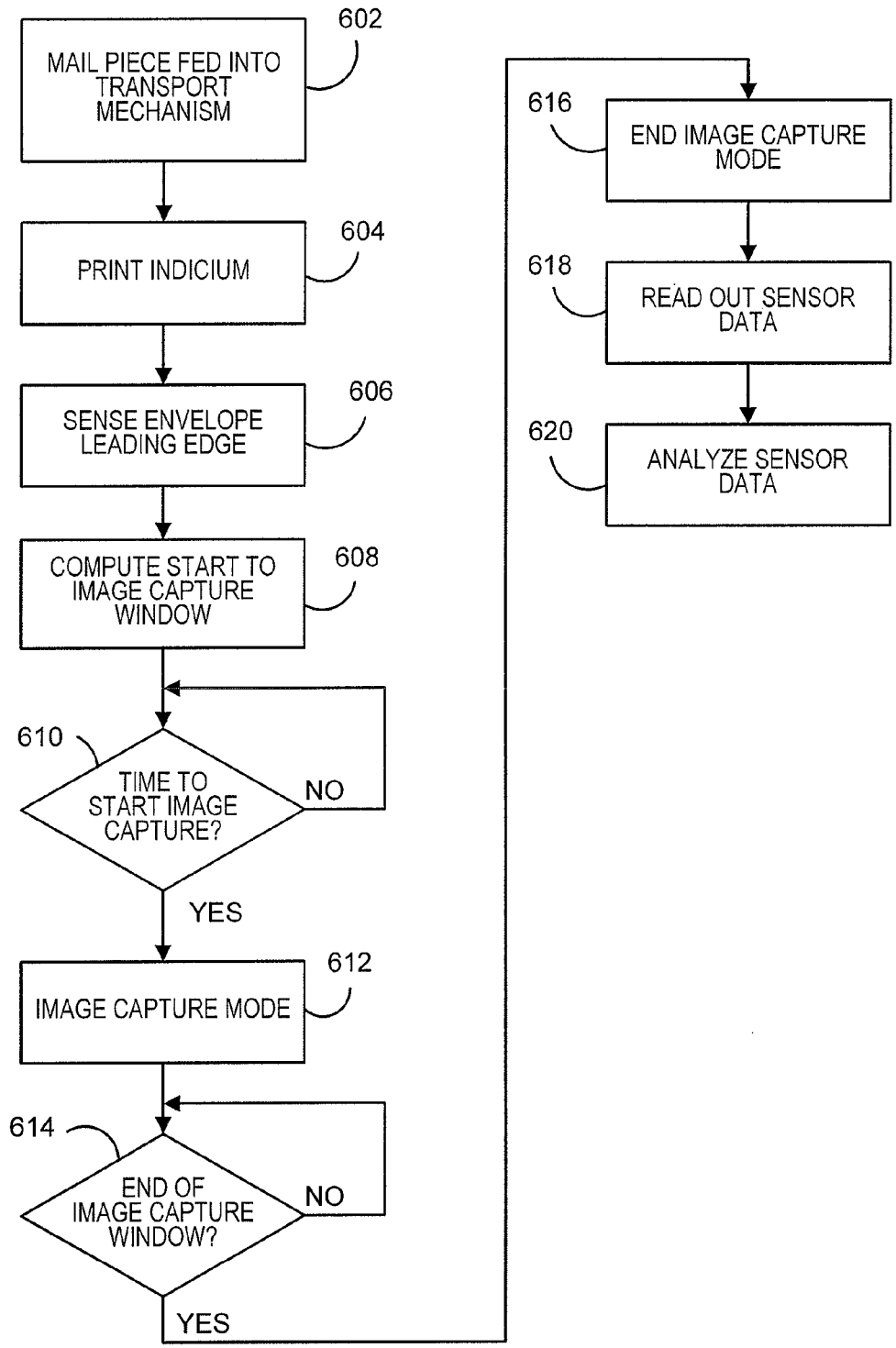
FIG. 6 is a flow chart that illustrates a process that may be performed by a control device that is part of the mailing machine.

At 602 in FIG. 6, a mail piece (e.g., like mail piece 100 of FIG. 4, but without the indicium 108) may be fed into the transport mechanism 40. At 604, the indicium (e.g., like indicium 108, FIG. 5) is printed on the mail piece 100 by the print head 44. This may be done under the control of control device 46 by selectively operating individual ink jet print elements 60 in a conventional manner as the mail piece 100 is transported along the transport path 42 past the print head 44/array 60 by the transport mechanism 40.

At 606 in FIG. 6, the sensor 49 senses the leading edge of the mail piece 100, providing a signal to that effect to control device 46. Next, at 608, the control device 46 computes a future point in time at which an image capture operation is to commence. That start time is computed by adding a predetermined time interval to the time at which the control device 46 received the signal from the sensor 49 to indicate that the mail piece leading edge had been detected. The time interval is established in the control device 46 and depends on the distance of the sensor 49 from the image capture element array 62, the speed at which the mail piece 100 is transported by the transport mechanism 40, and the distance from the leading edge of the mail piece to the leading edge of the barcode 110. In an alternative embodiment, the sensor 49 may be positioned downstream from the image capture element array 62, such that the leading edge of the mail piece reaches the sensor at an appropriate time to start the image capture mode to capture the smeared image of the barcode.

At decision block 610, the control device 46 determines whether the start time computed at 608 has been reached. When this occurs, step 612 takes place. At 612, the control device 46 places the image capture elements 62 of the image capture module 48 into a mode of operation in which image information is captured by the image capture elements. The time interval which sets the beginning of step 610 is set so that the placing of the image capture elements in the image capture mode occurs as the leading edge of the barcode 110 reaches the image capture element array 62 and after the preceding portion of the postage indicium 108 has passed the image capture element array. Step 612 continues with the image capture elements maintained in the image capture mode until the barcode 110 has entirely passed the image capture element array 62. At 614 the control device 46 determines when the barcode 110 passed the image capture element array. At that time, the control device 46 causes the image capture elements to end the image capture mode, as indicated at step 616. Then, at 618, the data accumulated in the image capture elements is read out to the image data analysis circuitry 50.

Figure 7:
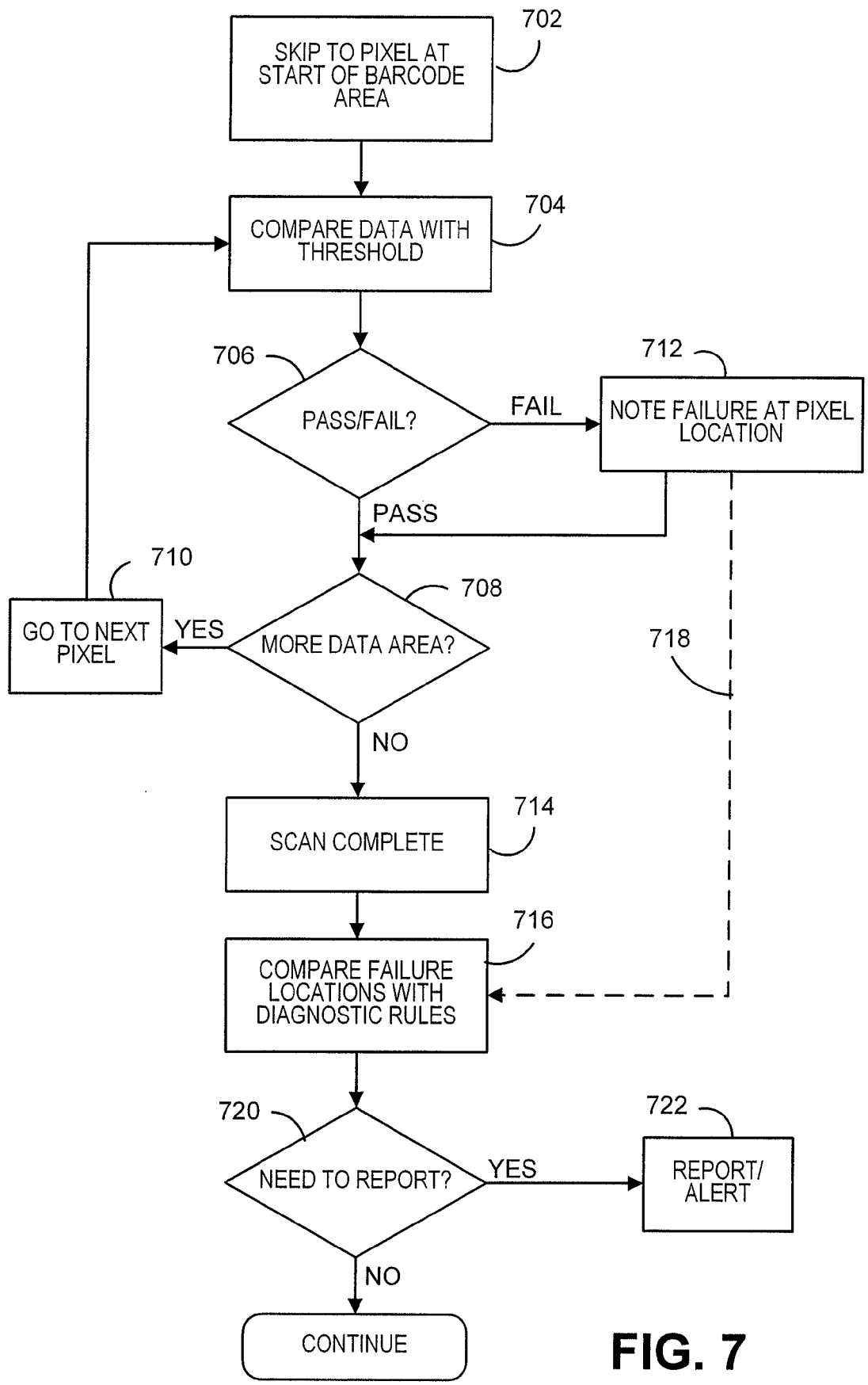
FIG. 7 is a flow chart that illustrates some details of the process of FIG. 6.

The total effect of steps 608-618 is to capture a smeared, linear (one pixel wide) image of only the barcode 110 portion of the postage indicium 108 on the mail piece 100. At 620, the image data analysis circuitry 50 analyzes the image data to detect potential failures in the ink jet image elements 60. FIG. 7 is a flow chart that illustrates details of step 620.

At 702 in FIG. 7, the image data analysis circuitry 50 skips to the pixel at an appropriate distance down the linear image to reach the top edge of the barcode 110. That is, the image data analysis circuitry 50 skips the upper part of the image data, since that image data comes from image capture elements that extend above the ink jet element array 60. Then, for the first pixel after the skipped image region, step 704 is performed. At step 704, the image data analysis circuitry 50 compares the data level for that pixel with a threshold. The threshold may, for example, be about 35% of the maximum pixel value (with the maximum pixel value corresponding to a solid printed row in the barcode). This 35% threshold may be selected as being well below the expected 50% duty cycle in the data portion of the Data Matrix barcode. Thus, if all of the ink jet print elements are working properly, the pixel value for each of the pixels in the smeared image should be at least 50% (i.e., about 100% for registration lines, and 50% for rows of data cells and for clock signals).

Considering again step 702, in some embodiments the pixel to which the image data analysis circuitry 50 skips may have been determined in a calibration process. Alternatively, however, the image data analysis circuitry may consider each pixel from the top of the image to determine whether the pixel represents the (envelope) background, or whether the image of the barcode has started.

At decision block 706, the image data analysis circuitry 50 determines whether the pixel value for the current pixel "passes" (i.e., exceeds the threshold) or "fails" (i.e., does not exceed the threshold). If the pixel value "passes", another decision block 708 follows. At decision block 708, it is determined whether there are further portions of the image which correspond to the locations of the ink jet print elements. If so, the image data analysis circuitry 50 considers the next pixel, as indicated at 710, and then loops back to step 704.

Considering again decision block 706, if the image data analysis circuitry 50 determines at that block that the current pixel value "fails", then block 712 follows decision block 706. At block 712, the image data analysis circuitry 50 notes the apparent failure at the current pixel location, and then advances to the decision block 708 referred to above.

Considering again decision block 708, if a negative determination is made at 708 (i.e., there are no more meaningful pixel locations to be examined), then the scan of the image data is complete, as indicated at 714, and the process advances to 716. At 716, the image data analysis circuitry 50 retrieves (as indicated by dashed line 718) the record of the pixel locations that failed, if any, and then applies one or more diagnostic rules to the set of image pixel locations for which failures were found.

To comment further on decision block 708, in some embodiments the end of the meaningful pixels in the image may have been previously determined in a calibration process. Alternatively, the end of the image may be detected by image analysis performed by the image data analysis circuitry.

Referring again to step 716, according to one example diagnostic rule, if two adjacent pixel locations were "failure" locations, then it may be considered that a corresponding ink jet print element has failed.

Another example diagnostic rule may hold that the image data analysis circuitry 50 should trigger a warning if one ink jet print element has failed. The rule may further hold that the image data analysis circuitry 50 should trigger a strong warning if two ink jet print elements have failed. Moreover, the rule may hold that the image data analysis circuitry 50 should warn that the entire print head is considered to have failed if four ink jet print elements have failed.

According to another example diagnostic rule, the rule stated in the above paragraph applies for the data areas of the barcode, but as to the clock or alignment areas of the barcode, one ink jet print element failure would elicit a strong warning and two ink jet print element failures would trigger a finding that the entire print head has failed.

Continuing to refer to FIG. 7, decision block 720 follows block 716. At decision block 720, the image data analysis circuitry 50 determines whether the diagnostic rules applied at 716 call for issuance of a warning or failure report. If so, the image data analysis circuitry 50 triggers (block 722) the alert output device 52 (FIG. 2) to issue the required warning or report of failure. If, at 720, the image data analysis circuitry 50 determines that no alert is needed, then the processing by the image data analysis circuitry 50 continues without issuance of an alert.

With this procedure, the mailing machine is able to self-monitor and to automatically diagnose and detect print head failures. Consequently, appropriate actions may be taken, either by a human operator or automatically, to shut down the postage meter in the event that proper printing is not taking place. This may serve to prevent loss of postage funds due to improper printing of postage indicia.

The principles of this invention may also be applied in a mailing machine that includes a thermal printing postage meter instead of an ink jet printing postage meter.

In some embodiments, the failure detection algorithm may be tuned to detect intermittent or partial failure of print elements in addition to detecting complete failures.

For the purposes of appended claims, the barcode may be considered to have passed the image capture module once it has passed the array of image capture elements.

In some embodiments, the triggering of the image capture mode may be predicated on the timing of the printing of the barcode, rather than based on sensing the leading edge of the mail piece. Thus the sensor 49 may be omitted, or may be used only for purposes other than triggering image capture. In other embodiments, the sensor 49 may be located some distance upstream from the location schematically indicated in FIG. 2.

In some embodiments, the mailing machine 10 may operate to capture an image and analyze the image for every 2-D barcode it prints. In other embodiments, the mailing machine 10 captures images only of some of the 2-D barcodes, say on every second, third, fifth or tenth mail piece.

Up to this point, the description has proposed that the 2-D barcode portion of the postage indicium be analyzed to detect print element failures. The 2-D barcode is very convenient for this purpose, since it exhibits a 50% duty cycle in the data and clock regions, and a 100% duty cycle in the horizontal reference lines. However, the principles of the present invention may alternatively be applied to analyzing a smeared image of a fixed element, such as a logo, that is included in the postage indicium. Suitable preliminary experiments may be employed to determine an expected profile of varying image intensity that will be exhibited by the smeared image of the fixed image element if properly printed. That expected profile may be stored in the image data analysis circuitry 50. When operating to detect failed print elements, the image data analysis circuitry 50 may compare the smeared image it receives against the expected profile. Another type of image element that could be subjected to such analysis would be a POSTNET barcode, which always has a predetermined number of tall and short bars.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. A method comprising:
    transporting a mail piece along a transport path past a print head and an image capture device, the print head including a linear array of print elements, the array oriented transversely to a direction in which the mail piece is transported, the image capture device downstream from said print head along said transport path, the image capture device including a linear array of image capture elements, the array of image capture elements oriented parallel to the array of print elements, the image capture device positioned to capture an image of an indicium printed by the print head on the mail piece;
    while the mail piece is being transported past the print head, selectively operating ones of the print elements to print an image element on the mail piece;
    detecting a leading edge of the mail piece; and
    triggering the placing of the image capture elements in an image capture mode at a predetermined time interval after a point in time when the leading edge of the mail piece was detected so that the image capture elements are in the image capture mode before the image element reaches the image capture device;
    while the mail piece is being transported past the image capture device maintaining the image capture elements in the image capture mode;
    maintaining the image capture elements in the image capture mode until the image element has entirely passed the image capture device;
    ending the image capture mode after the image element has entirely passed the image capture device; and
    analyzing image signals generated by said image capture elements during said image capture mode to determine whether any of said print elements has failed.

2. The method according to claim 1, wherein the image element is a two-dimensional barcode that is part of the indicium.

3. The method according to claim 1, wherein the image element is a logo that is part of the indicium.

4. The method according to claim 1, wherein the image element is a POSTNET barcode.

5. The method according to claim 1, wherein the print head is part of a postage meter.

6. The method according to claim 5, wherein the transporting is performed by a mail piece transport mechanism that is part of a mailing machine in which the postage meter is installed.

7. The method according to claim 1, wherein said image signals represent an image of said image element, said image of said image element being a linear image that is one pixel wide.

8. The method according to claim 7, wherein said analyzing begins at a predetermined distance from a top end of the image of said image element and ends at a predetermined distance from a bottom end of the image of said image element.

9. The method according to claim 7, wherein said analyzing includes detecting beginning and ending points of said image of said image element.

10. The method according to claim 7, wherein said analyzing step includes detecting gaps in said image of said image element.

11. The method according to claim 1, wherein said transporting is performed at a rate of at least about 50 inches per second.

12. The method according to claim 1, wherein the print elements are ink jet print elements.

13. A mailing machine comprising:
a transport mechanism for transporting a mail piece along a transport path;
a print head located adjacent the transport path for printing a postage meter indicium on the mail piece while the mail piece is transported past the print head, the print head including a linear array of print elements, the array oriented transversely to a direction in which the mail piece is transported;
an image capture device located adjacent the transport path downstream from the print head, the image capture device including a linear array of image capture elements, the array of image capture elements oriented parallel to the array of ink jet print elements, the image capture device positioned to capture an image of the postage meter indicium printed by the print head on the mail piece; and
at least one control device coupled to the transport mechanism, the print head and the image capture device, the at least one control device operative to:
control the print head so as to selectively operate ones of the print elements to print an image element on the mail piece as part of the postage indicium;
control the image capture device (a) such that the image capture elements are (i) placed in an image capture mode before the image element reaches the image capture device, and (ii) maintained in the image capture mode until the image element has entirely passed the image capture device, and (b) such that said image capture mode is ended after the image element has entirely passed the image capture device; and
analyze image signals generated by said image capture elements during said image capture mode to determine whether any of said print elements has failed and
a sensor located adjacent the transport path between the print head and the image capture device, the sensor for detecting a leading edge of the mail piece, the sensor coupled to the at least one control device, the at least one control device responsive to the sensor by triggering the placing of the image capture elements in the image capture mode at a predetermined time interval after a point in time when the sensor detected the leading edge of the mail piece.

14. The mailing machine according to claim 13, wherein said image signals represent an image of said image element, said image of said image element being a linear image that is one pixel wide.

15. The mailing machine according to claim 14, wherein the image element is a two-dimensional barcode included in the postage meter indicium.

16. The mailing machine according to claim 15, wherein said analyzing function includes detecting gaps in said image of said image element.

17. The mailing machine according to claim 13, wherein said transporting is performed at a rate of at least about 50 inches per second.

18. The mailing machine according to claim 13, wherein the print elements are ink jet print elements.

* * * * *